(12) United States Patent
Winston

(10) Patent No.: US 10,187,527 B2
(45) Date of Patent: Jan. 22, 2019

(54) RESIDENT INFORMATION BOX

(71) Applicant: LaTricia Winston, Houston, TX (US)

(72) Inventor: LaTricia Winston, Houston, TX (US)

(*) Notice: Subject to any disclaimer, the term of this patent is extended or adjusted under 35 U.S.C. 154(b) by 0 days.

(21) Appl. No.: 15/820,357

(22) Filed: Nov. 21, 2017

(65) Prior Publication Data

US 2018/0146095 A1    May 24, 2018

Related U.S. Application Data

(60) Provisional application No. 62/426,187, filed on Nov. 23, 2016.

(51) Int. Cl.
| | | |
|---|---|---|
| *H04M 1/60* | (2006.01) | |
| *H04M 9/00* | (2006.01) | |
| *H04M 3/537* | (2006.01) | |
| *H04M 11/06* | (2006.01) | |
| *H04M 1/24* | (2006.01) | |
| *H04M 3/533* | (2006.01) | |
| *H04L 12/58* | (2006.01) | |
| *G06F 3/16* | (2006.01) | |
| *H04M 7/00* | (2006.01) | |

(52) U.S. Cl.
CPC .............. *H04M 3/537* (2013.01); *H04M 1/24* (2013.01); *H04M 3/5335* (2013.01); *H04M 11/062* (2013.01); *G06F 3/16* (2013.01); *H04L 51/24* (2013.01); *H04M 7/0042* (2013.01); *H05K 999/99* (2013.01)

(58) Field of Classification Search
CPC .... H04M 3/537; H04M 11/062; H04M 11/14; H04M 3/5335; H04M 7/0042; H04L 51/24; G06L 3/16; H05K 999/99

USPC ......... 379/157, 159, 167.02, 167.08, 167.15, 379/177
See application file for complete search history.

(56) References Cited

U.S. PATENT DOCUMENTS

| | | | | |
|---|---|---|---|---|
| 5,303,300 A | * | 4/1994 | Eckstein ............... | H04M 11/025 379/102.06 |
| 5,657,380 A | * | 8/1997 | Mozer .................. | H04M 1/0291 340/565 |
| 5,903,869 A | * | 5/1999 | Jacobson ............. | A47G 29/122 248/205.3 |
| 5,914,826 A | * | 6/1999 | Smallwood .......... | H01H 15/102 360/12 |
| 5,973,591 A | * | 10/1999 | Schwartz ................. | G08B 3/10 340/384.1 |
| 6,041,106 A | * | 3/2000 | Parsadayan .......... | H04M 11/025 379/102.06 |
| 6,060,979 A | * | 5/2000 | Eichsteadt ............. | H04M 11/04 340/287 |
| 6,233,328 B1 | * | 5/2001 | Wolf .................... | H04M 1/0291 379/159 |
| 6,317,489 B1 | * | 11/2001 | Parsadayan .......... | H04M 11/025 379/102.06 |
| 6,324,261 B1 | * | 11/2001 | Merte .................. | H04M 1/0291 379/102.06 |
| 6,721,408 B1 | * | 4/2004 | Bain .................... | H04M 1/0291 379/157 |

(Continued)

*Primary Examiner* — Binh Kien Tieu

(57) ABSTRACT

A resident information box system incorporating the installation of call boxes within each apartment structured and arranged to be linked to a single phone number for delivering messages from management, without having to waste natural resources, like paper and electricity, as well as the time and effort of the management staff.

18 Claims, 3 Drawing Sheets

(56) References Cited

U.S. PATENT DOCUMENTS

| | | | |
|---|---|---|---|
| 6,748,061 B2* | 6/2004 | Ahlstrom | H04M 11/025 |
| | | | 379/102.01 |
| 7,047,087 B2* | 5/2006 | Hantke | G07C 9/00182 |
| | | | 700/17 |
| 7,337,016 B2* | 2/2008 | Hantke | G07C 9/00182 |
| | | | 340/5.71 |
| 7,400,716 B1* | 7/2008 | Gibson, Sr. | H04M 1/0291 |
| | | | 379/167.01 |
| 9,286,786 B2* | 3/2016 | Pham | G08B 17/06 |
| 9,584,775 B2* | 2/2017 | Siminoff | H04M 11/025 |
| 9,691,199 B1* | 6/2017 | Rapp | G07C 9/00015 |
| 2003/0052778 A1* | 3/2003 | Wong | G06Q 10/087 |
| | | | 340/540 |

* cited by examiner

RESIDENT INFORMATION BOX

CROSS-REFERENCE TO RELATED APPLICATION

The present application is related to and claims priority from provisional application Ser. No. 62/426,187, filed Nov. 23, 2016 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of communication devices and more specifically relates to the installation of call boxes within each apartment structured and arranged to be linked to a single phone number for delivering messages from management, without having to waste natural resources, like paper and electricity, as well as the time and effort of the management staff.

2. Description of the Related Art

While managing an apartment complex, there are times when a manager has to relay messages to the occupants of all the apartments in their complex. They must waste time, ink and paper, printing out copies of the messages and posting them on every door. They has no way to confirm when and if the residents see these messages, and when children are playing or the wind catches the paper, the messages may never reach the intended parties. Unfortunately, there is not an efficient way to quickly reach the tenants or a large number of people such as in a hospital, nursing home, or office for example, at the same time. Therefore, a need exists for a communication system to relay an important message to a large group of people efficiently.

Various attempts have been made to solve the problems which may be found in the related art but have thus far been unsuccessful. A need exists for a reliable Resident Information Box (R.I.B.) to avoid the above-mentioned problems.

BRIEF SUMMARY OF THE INVENTION

In view of the foregoing disadvantages inherent in the known art, the present invention provides a novel Resident Information Box (R.I.B.). The general purpose of the present invention, which will be described subsequently in greater detail, is to provide the installation of call boxes within each apartment structured and arranged to linked to a single phone number for delivering messages from management, without having to waste natural resources, like paper and electricity, as well as the time and effort of the management staff The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Resident Information Box (R.I.B.), constructed and operative according to the teachings of the present invention.

The various embodiments of the present invention will hereinafter be described in conjunction with the appended drawings.

DETAILED DESCRIPTION

As discussed above, embodiments of the present invention relate to a communication device and more particularly to a Resident Information Box (R.I.B.).

The Resident Information Box (R.I.B.) is designed to provide a quick and easy way to reach all the tenants within an apartment complex at the same time. A box, roughly the size of a thermostat, would be installed in each unit, mounted on the wall approximately six feet from the floor, beyond the reach of children. The box is equipped with a speaker (for the messages), an LED blink light, a battery pack, a single button, and a speaker, which emits a beeping tone to alert residents to listen to the messages. The battery compartment is located on the side of the box, and is locked. Residents will be unable to remove the batteries as only maintenance workers will have a key and will be able to change the batteries as needed. Every box will be connected to a single phone number, and the management office will call that number to leave a message.

The message will then be dispersed to each box inside each apartment in the community at the same time. When a message is delivered to the box, the LED light will blink so the tenants will know there is a new message. After a desired amount of time, as determined by the management staff, and depending on the urgency of the message, the speaker will emit a beep (similar to the beep of a smoke detector). It will continue to beep until the button is pushed. Pushing the button activates the automated delivery of the message through the large speaker on the front. Once the message has been heard, confirmation of its delivery will be sent to the management office using email or a different format. Messages sent to the R.I.B. can also be forwarded to personal mobile devices after the message has been sent to the R.I.B., depending on the urgency of the message. The color and size of the R.I.B. will vary depending on the interior of the dwelling and the space for installation.

Figure 1:
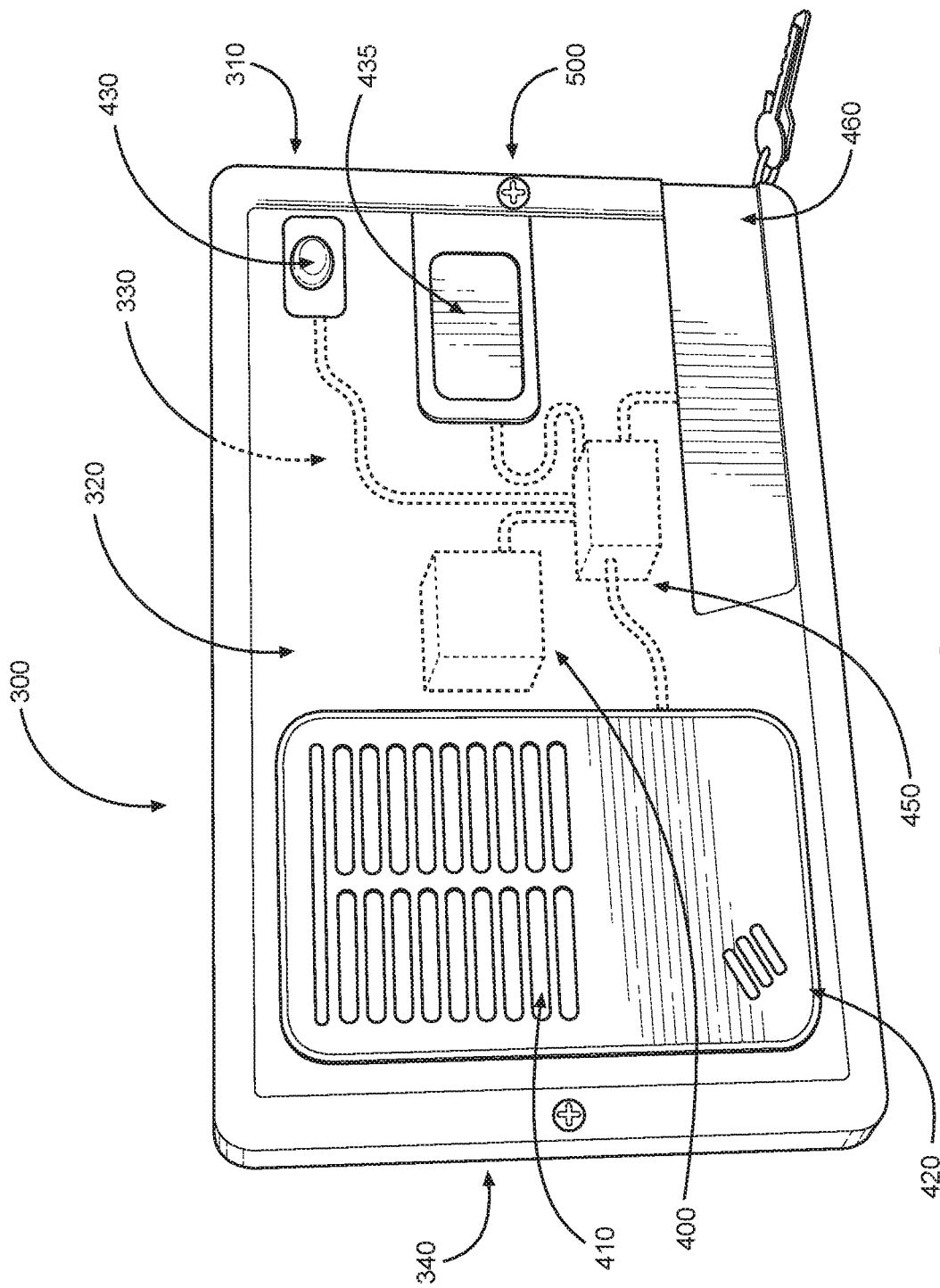
FIG. 1 shows a perspective view illustrating the Resident Information Box according to the preferred embodiment of the present invention.
Figure 2:
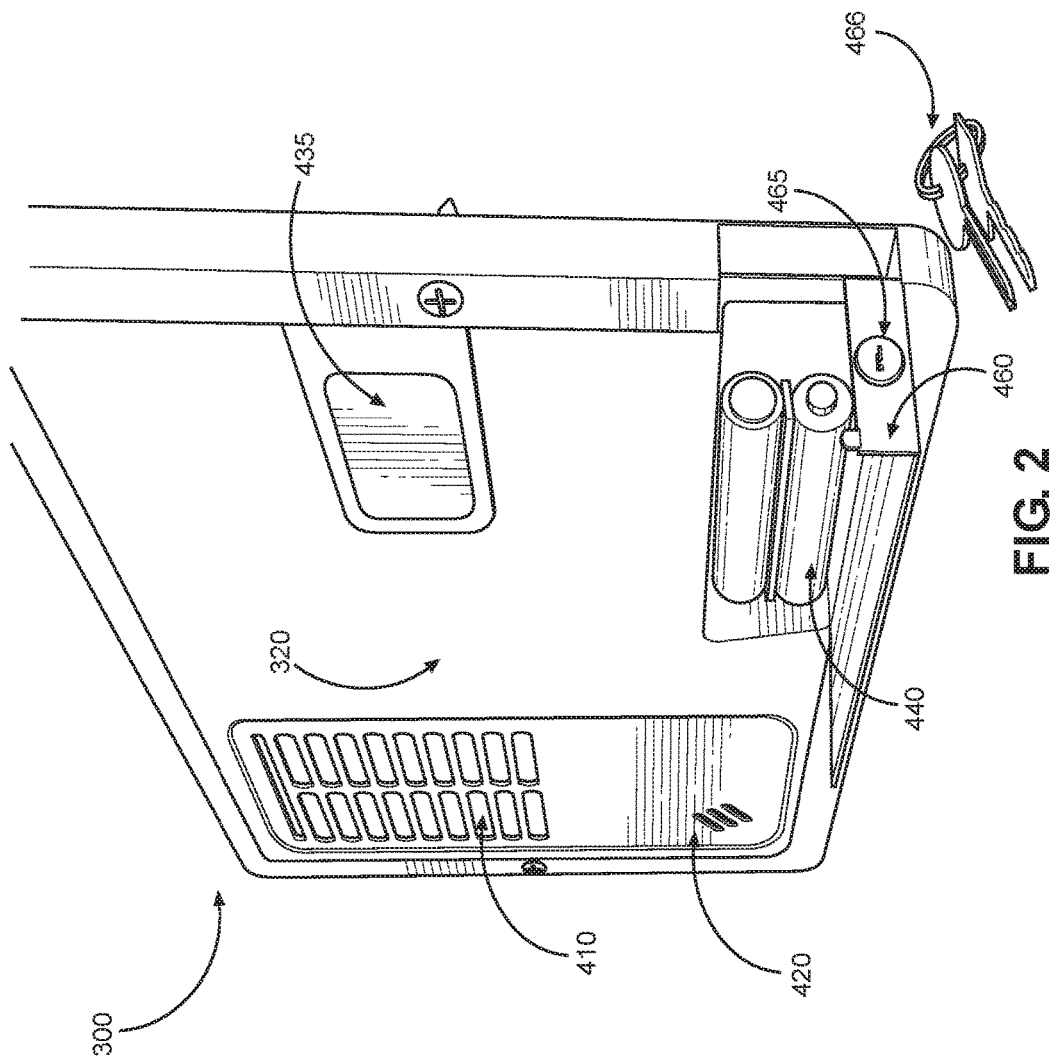
FIG. 2 shows another perspective view illustrating the Resident Information Box according to the preferred embodiment of the present invention of FIG. 1.
Figure 3:
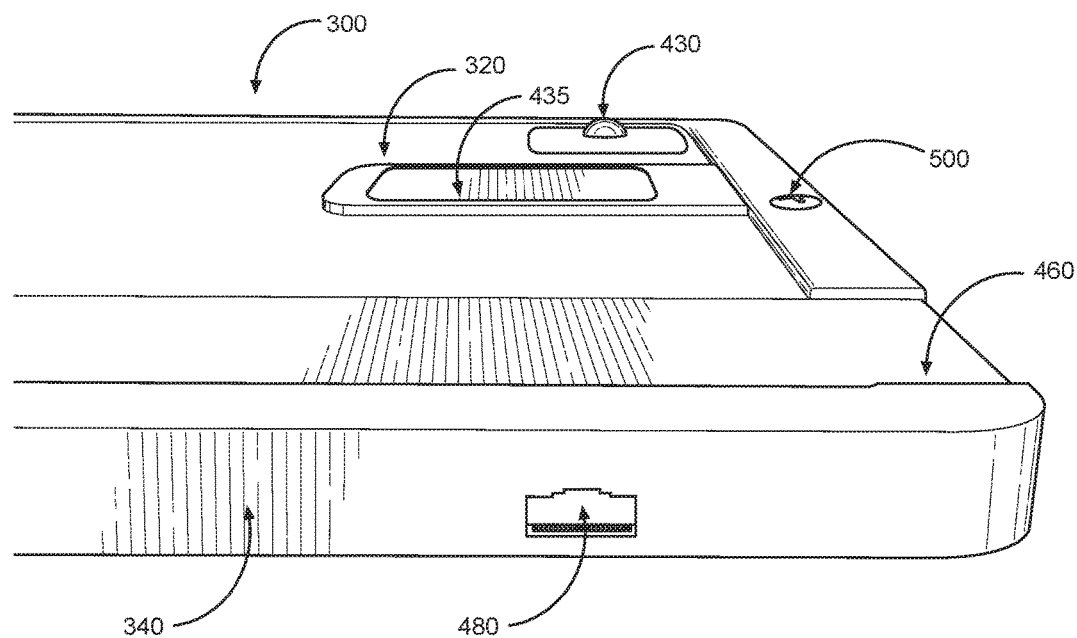
FIG. 3 shows a bottom perspective view illustrating the Resident Information Box according to the preferred embodiment of the present invention of FIG. 1.
Figure 4:
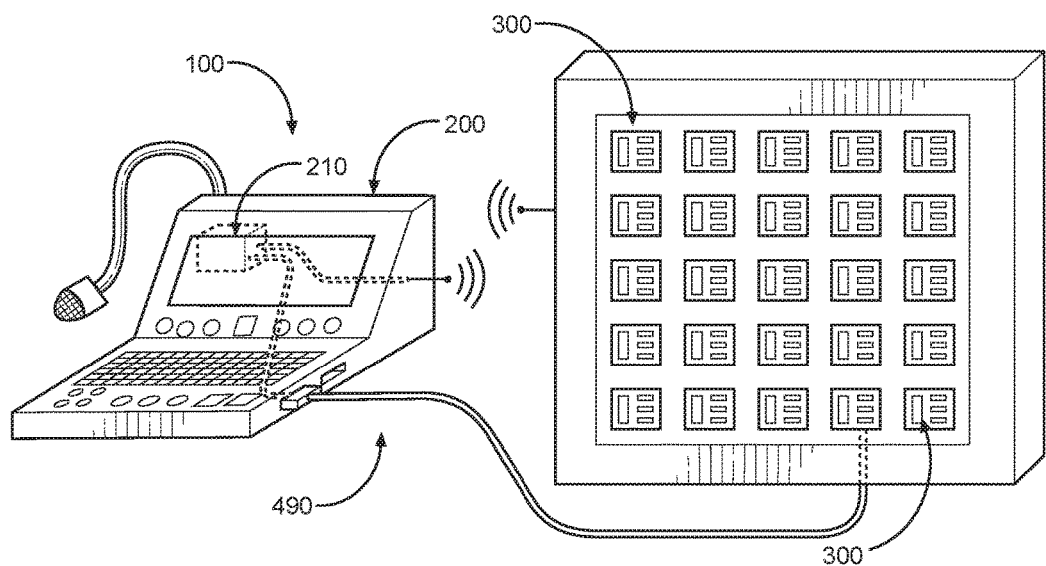
FIG. 4 shows a perspective view illustrating a residential information system including a main computer module and a plurality of residential information boxes according to the preferred embodiment of the present invention of FIG. 1.

The unique features of this invention will provide the following benefits for consumers everywhere:

A new device to improve communications between management and tenants in an apartment complex Will be used to ensure the efficient delivery of important messages to all the residents Will eliminate the waste of ink, paper, wear and tear on copy machines, and much time and effort to post messages on each of the doors Will save time and money, as the staff will be able to complete more important tasks when they no longer have to spend time delivering messages The alert speaker will also emit sound, warning residents and management when the batteries are low and need to be replaced Supports the green movement by eliminating the waste of natural resources This system can be modified for use in a wide variety of other businesses Referring now to the drawings FIGS. 1-5, the preferred embodiment is formed as a residential information system 100 comprising a main computer module 200 including at least one computer application adapted to individually control a plurality of residential information boxes 300, and a transceiver member 210 electronically connected with the at least one computer application and adapted to send and receive electronic signals from the plurality of residential information boxes 300; wherein the at least one computer application is adapted to receive messages from a user and send the messages to a selected number of the plurality of residential information boxes; and wherein the at least one computer application is adapted to receive electronic signals from the plurality of residential information boxes to relay to said user; and a plurality of residential information boxes 300, each comprising a main body 310 including a front panel 320, a back panel 330, at least one side panel 340 extending between the front panel and the back panel, wherein the at least one side panel, the front panel, and the back panel form an interior volume, and at least one attachment member 500 adapted to releasably attach the residential information box to a supporting surface; a transceiver member 400 located within the interior volume adapted to receive electronic signals from a transmitter and send electronic signals to the main computer module; a computer module 450 located within the interior volume and is electronically connected to the transceiver; a main speaker member 410 attached to the front panel and is electronically connected to the computer module; a secondary speaker member 420 attached to the front panel and is electronically connected to the computer module; a notification light 430 attached to the front panel and is electronically connected to the computer module; a notification button 435 attached to said front panel and is electronically connected to the computer module; at least one battery member 440 removably placed within the interior volume and is electronically connected to and adapted to supply power to the transceiver member, the computer module, the main speaker member, the secondary speaker member, the notification light, and the notification button; a battery door member 460 including a lock member 465 attached thereto and adapted to releasably connect to an interior portion of the front panel via a key member 466, wherein the battery door member is pivotally connected to the front panel and is adapted to provide access to the battery member; a key member 466 adapted to releasably connect the lock member of the battery door member to the interior portion of the front panel, wherein the residential information box is adapted such that a user can send an electronic message to the computer module via the main computer module; wherein the computer module activates and turns on and off the notification light and selectively activates and allows an audio sound to emit from the secondary speaker member; wherein an intended receiver of the electronic message can view the notification light and hear the audio sound emitted from the secondary speaker member and press the notification button to retrieve and hear the electronic message from the user via the main speaker member;

The residential information system may further comprise an ethernet port 480 attached to the at least one side panel and is electronically connected to and adapted to send electronic signals to the computer module via ethernet wiring 490, such that the computer module is adapted to receive electronic signals via the ethernet port 480 and the ethernet wiring 490 from a chosen telephone number. Further, the computer module is adapted to send a message heard confirmation electronic signal to the main computer module 200 via the transceiver after said user has listened to said electronic message from said user, wherein the message heard confirmation electronic signal to said user may be in a format including e-mailing, text messaging, and automated phone calls. Furthermore, the computer module is adapted to detect the battery member's power level, and when a predetermined level is reached the computer module is adapted to activate the secondary speaker member to emit an audio sound warning that the battery member needs to be replaced.

The notification light 430 may be formed as a light emitting diode. The audio sound emitted from the secondary speaker member 420 may be a repeating beeping tone. Furthermore, the at least one attachment member 500 may be formed as a screw member.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A residential information box comprising:
a main body including:
  a front panel;
  a back panel;
  at least one side panel;
    wherein said at least one side panel extends between said front panel and said back panel;
  wherein said at least one side panel, said front panel, and said back panel form an interior volume; and
  at least one attachment member;
    wherein said at least one attachment member is adapted to releasably attach said residential information box to a supporting surface;
a transceiver member;
  wherein said transceiver member is located within said interior volume and is adapted to receive electronic signals from a transmitter and send electronic signals to other electronic components;
a computer module;
  wherein said computer module is located within said interior volume and is electronically connected to said transceiver;
a main speaker member;

wherein said main speaker member is attached to said front panel and is electronically connected to said computer module;
a secondary speaker member;
wherein said secondary speaker member is attached to said front panel and is electronically connected to said computer module;
a notification light;
wherein said notification light is attached to said front panel and is electronically connected to said computer module;
a notification button;
wherein said notification button is attached to said front panel and is electronically connected to said computer module;
at least one battery member;
wherein said at least one battery member is removably placed within said interior volume and is electronically connected to and adapted to supply power to said transceiver member, said computer module, said main speaker member, said secondary speaker member, said notification light, and said notification button;
a battery door member including:
a lock member attached thereto and adapted to releasably connect to an interior portion of said front panel via a key member;
wherein said battery door member is pivotally connected to said front panel, and is adapted to provide access to said battery member;
a key member;
wherein said key member is adapted to releasably connect said lock member of said battery door member to said interior portion of said front panel;
wherein said residential information box is adapted such that a user can send an electronic message to said computer module;
wherein said computer module activates and turns on and off said notification light and selectively activates and allows an audio sound to emit from said secondary speaker member;
wherein an intended receiver of said electronic message can view said notification light and hear said audio sound emitted from said secondary speaker member and press said notification button to retrieve and hear said electronic message from said user via said main speaker member.

2. The residential information box of claim 1, wherein said notification light is formed as a light emitting diode.

3. The residential information box of claim 1, wherein said audio sound emitted from said secondary speaker member is a repeating beeping tone.

4. The residential information box of claim 1, further comprising an ethernet port attached to said at least one side panel and is electronically connected to and adapted to send electronic signals to said computer module via ethernet wiring.

5. The residential information box of claim 4, wherein said computer module is adapted to receive electronic signals via said ethernet port and said ethernet wiring from a chosen telephone number.

6. The residential information box of claim 1, wherein said computer module is adapted to send a message heard confirmation electronic signal to said user via said transceiver after said user has listened to said electronic message from said user.

7. The residential information box of claim 6, wherein said message heard confirmation electronic signal is sent to said user in a format chosen from a list of formats consisting of e-mailing, text messaging, and automated phone calls.

8. The residential information box of claim 1, wherein said at least one attachment member is formed as a screw member.

9. The residential information box of claim 1, wherein said computer module is adapted to detect said battery member's power level, and when a predetermined level is reached said computer module is adapted to activate said secondary speaker member to emit an audio sound warning that said battery member needs to be replaced.

10. A residential information system comprising:
a main computer module including:
at least one computer application;
wherein said at least one computer application is adapted to individually control a plurality of residential information boxes; and
a transceiver member;
wherein said transceiver member is electronically connected with said at least one computer application and adapted to send and receive electronic signals from said plurality of residential information boxes;
wherein said at least one computer application is adapted to receive messages from a user and send said messages to a selected number of said plurality of residential information boxes; and
wherein said at least one computer application is adapted to receive electronic signals from said plurality of residential information boxes to relay to said user; and
a plurality of residential information boxes, each comprising:
a main body including:
a front panel;
a back panel;
at least one side panel;
wherein said at least one side panel extends between said front panel and said back panel;
wherein said at least one side panel, said front panel, and said back panel form an interior volume; and
at least one attachment member;
wherein said at least one attachment member is adapted to releasably attach said residential information box to a supporting surface;
a transceiver member;
wherein said transceiver member is located within said interior volume and is adapted to receive electronic signals from a transmitter and send electronic signals to said main computer module;
a computer module;
wherein said computer module is located within said interior volume and is electronically connected to said transceiver;
a main speaker member;
wherein said main speaker member is attached to said front panel and is electronically connected to said computer module;
a secondary speaker member;
wherein said secondary speaker member is attached to said front panel and is electronically connected to said computer module;
a notification light;

wherein said notification light is attached to said front panel and is electronically connected to said computer module;
a notification button;
   wherein said notification button is attached to said front panel and is electronically connected to said computer module;
at least one battery member;
   wherein said at least one battery member is removably placed within said interior volume and is electronically connected to and adapted to supply power to said transceiver member, said computer module, said main speaker member, said secondary speaker member, said notification light, and said notification button;
a battery door member including:
   a lock member attached thereto and adapted to releasably connect to an interior portion of said front panel via a key member;
   wherein said battery door member is pivotally connected to said front panel, and is adapted to provide access to said battery member;
a key member;
   wherein said key member is adapted to releasably connect said lock member of said battery door member to said interior portion of said front panel;
wherein said residential information box is adapted such that a user can send an electronic message to said computer module via said main computer module;
wherein said computer module activates and turns on and off said notification light and selectively activates and allows an audio sound to emit from said secondary speaker member;
wherein an intended receiver of said electronic message can view said notification light and hear said audio sound emitted from said secondary speaker member and press said notification button to retrieve and hear said electronic message from said user via said main speaker member.

11. The residential information system of claim 10, wherein said notification light is formed as a light emitting diode.

12. The residential information system of claim 10, wherein said audio sound emitted from said secondary speaker member is a repeating beeping tone.

13. The residential information system of claim 10, further comprising an ethernet port attached to said at least one side panel and is electronically connected to and adapted to send electronic signals to said computer module via ethernet wiring.

14. The residential information system of claim 13, wherein said computer module is adapted to receive electronic signals via said ethernet port and said ethernet wiring from a chosen telephone number.

15. The residential information system of claim 10, wherein said computer module is adapted to send a message heard confirmation electronic signal to said main computer module via said transceiver after said user has listened to said electronic message from said user.

16. The residential information system of claim 10, wherein said computer module is adapted to send a message heard confirmation electronic signal to said user in a format chosen from a list of formats consisting of e-mailing, text messaging, and automated phone calls.

17. The residential information system of claim 10, wherein said at least one attachment member is formed as a screw member.

18. The residential information system of claim 10, wherein said computer module is adapted to detect said battery member's power level, and when a predetermined level is reached said computer module is adapted to activate said secondary speaker member to emit an audio sound warning that said battery member needs to be replaced.

* * * * *